April 29, 1924.

O. A. COLBY

PERCOLATOR

Filed June 10, 1922

1,492,160

WITNESSES:
R. S. Harrison
N. M. Biebel

INVENTOR
Ora A. Colby,
BY
Wesley G. Carr
ATTORNEY

Patented Apr. 29, 1924.

1,492,160

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

PERCOLATOR.

Application filed June 10, 1922. Serial No. 567,443.

*To all whom it may concern:*

Be it known that I, ORA A. COLBY, a citizen of the United States, and a resident of Irwin, in the county of Westmoreland and State of Pennsylvania, have invented a new and useful Improvement in Percolators, of which the following is a specification.

My invention relates to electrically heated devices and particularly to electric percolators and it has for one of its objects to provide a relatively simple and inexpensive construction for an electrically heated percolator.

Another object of my invention is to provide a relatively simple and easily replaceable electric heating element for an electric percolator.

Another object of my invention is to provide a vaporizing chamber for an electric percolator so constructed that the percolating action shall begin within a relatively short time after the heating element is energized.

Another object of my invention is to provide a relatively simple and easily installed means for reducing the amount of heat radiated downwardly from said heating element.

In practising my invention, I provide a fluid container having a hollow supporting base, with a depending tubular member extending into the container through an opening in the bottom thereof. The tubular member has a laterally extending integral flange portion intermediate its ends and is provided with an axial opening in its upper part to constitute a vaporizing chamber for the fluid container. I provide one or two flat heating elements operatively engaging the flange portion and I provide a co-operating removable flange member to securely clamp the heating elements in proper operative position on, and extending laterally of, the tubular member, intermediate its ends. If two heating elements are employed, a relatively thin sheet-metal plate is placed therebetween to assist in conducting heat to the vaporizing chamber. A disk of heat-insulating material is located on the lower end of the tubular member, a single means being provided to clamp the heating elements between the two flange portions and to hold the heat-insulating member in its proper operative position on the tubular member.

In the single sheet of drawings.

Figure 1:
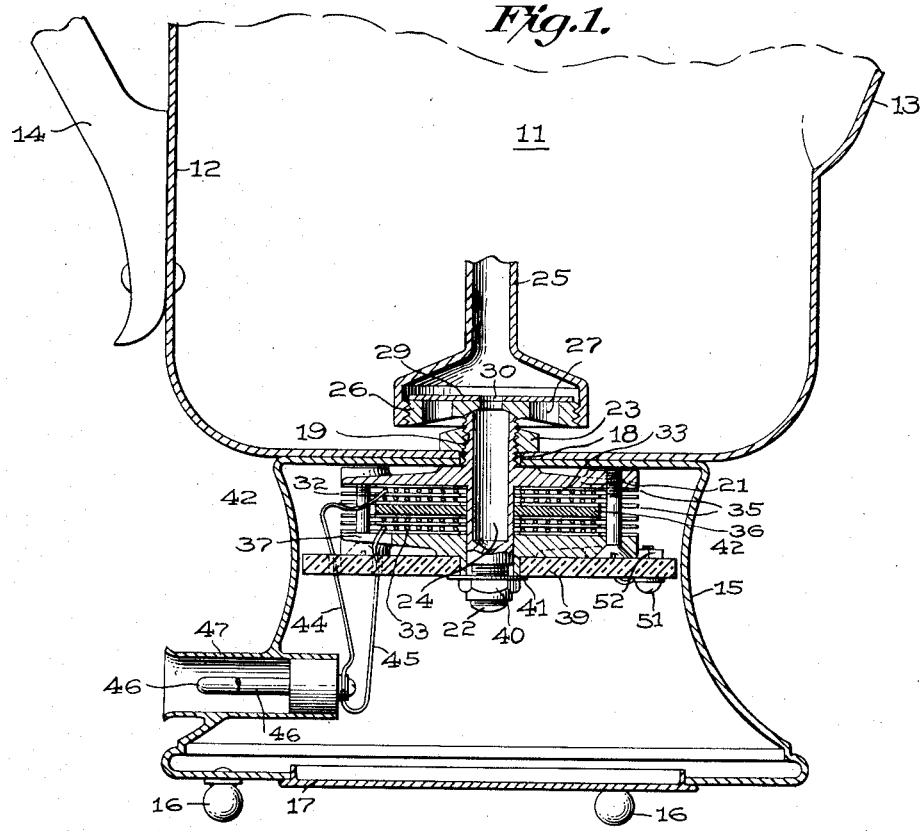
Figure 1 is a view, in vertical section, of an electrically heated percolator comprising the device embodying my invention.
Figure 2:
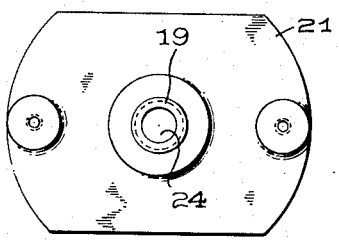
Fig. 2 is a top plan view of a portion of the device embodying my invention.

A percolator, designated generally by the numeral 11, comprises a fluid container 12 having a spout 13, a handle 14 and a hollow supporting base 15, which is provided with heat-insulating supporting knobs 16. The bottom of the base 15 may be open and a suitable cover member 17 be normally frictionally held therein. An opening 18 is provided through the bottom of the container 12 and the top of the hollow base 15, through which extends an upper portion 19 of a tubular member which comprises, in addition to the member 19, a laterally extending integral flange 21 and a depending integral portion 22. The portion 19 is provided with external screw threads to permit of mounting thereon a nut 23 to securely clamp the tubular member in its proper operative position, substantially as illustrated in Fig. 1 of the drawing; and, at the same time, provide a water-tight construction. An axial opening 24 is provided in the tubular member extending from the top thereof to a small distance from the bottom of the portion 22. This opening or chamber 24 constitutes a vaporizing chamber for the percolator.

A fountain tube 25, having a suitable valve at the bottom thereof, is provided. The valve comprises a member 26 which has screw threaded engagement with the interior surface of the expanded end of the fountain tube 25 and is provided with a plurality of openings 27 extending axially therethrough. A vertically movable plate 29, having a central opening 30, is located on the member 26, these parts constituting a valve such as is usual in percolators of this type. While I have illustrated a specific construction of valve, this forms no part of my invention and any desired type may be employed.

Figure 3:
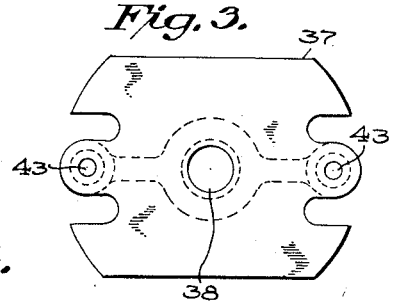
Fig. 3 is a top plan view of a flange member comprising a part of the device embodying my invention.
Figure 4:
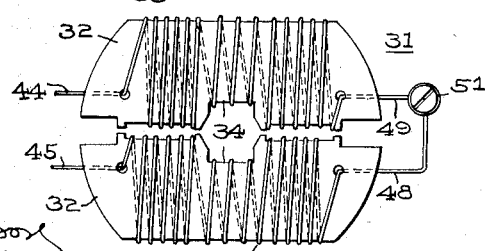
Fig. 4 is a top plan view of one of the electric heating elements comprising a part of the device embodying my invention.

A heating element, designated generally by the numeral 31, comprises two co-operating sheets 32 of mica, substantially rectangular in contour, upon each of which is wound a resistor member 33 of a suitable cross-section and length to be energized by a suitable supply-circuit conductor, (not shown). The two mica sheets 32 are located in opposed spaced-apart relation, a cut-out portion 34 being provided at the middle portion of each in order to closely engage the central portion of the depending tubular member immediately below the flange portion 21. Relatively thin mica sheets 35 are placed, one on each side of the heating unit 31, in order to insulate the resistor 33 from the flange member 21 or other metallic supporting members. When two heating units are employed, a relatively thin sheet-metal plate 36 is placed between the units. A removable laterally-extending flange member 37, shown in Fig. 3, is placed below the heating unit if only one is employed, or below the lower heating unit when two are employed. The flange 37 is provided with a substantially central opening 38 to fit closely upon the depending member 22 in order to provide a good heat-conducting path between the outer portions of the flange member 37 and the member 22.

In order to reduce the amount of heat lost by radiation downwardly from the bottom of the flange 37, I provide a disk 39 of a suitable heat-insulating material which is mounted on a depending flange portion of the member 37. A nut 40 and washer 41 are employed to suitably clamp the lower flange member 37 against the heating units and also to hold the heat-insulating member 39 in its proper operative position, substantially as illustrated in the drawing.

If it is desired to employ a construction of heating element which will permit of using the same percolator on either 110 or 220 volt circuits, it is desirable to employ two separate heating elements, each of which is of such construction as to permit of being connected to a 110 volt circuit. In case it is desired to employ the percolator on a 220 volt circuit, the resistors of the two heating units may be connected in series-circuit relation to each other, while, if it is desired to employ the percolator on a 110 volt circuit, they may be connected in parallel-circuit relation to each other.

By providing relatively compact heating elements of substantially the form indicated in the drawing and making the dimensions thereof relatively small and, further, by so mounting the heating units that the vaporizing chamber extends through these heating units, I obtain a relatively short path through which the heat must travel in order to reach the vaporizing chamber and there become effective to cause a percolating action in the usual well known manner. As the temperature at the top of the hollow base 15 is maintained at a relatively low value because of the presence of water in the bottom of the container 12, the temperature at the top of the heating element is somewhat lower than at the bottom of the heating element, that is, the temperature of the integral flange member 21 is relatively lower than the temperature of the flange member 37. I provide a plurality of relatively heavy flat-head machine screws 42 located adjacent the edge of the flange members 21 and 37, which screws are effective not only to maintain the outer ends of the flange members in proper operative positions relatively to each other, but also afford a path for heat to travel from the bottom flange 37 to the top flange 21. In this way I maintain the temperature at the top and at the bottom of the heating element at substantially the same value, thus ensuring a still quicker initiation of the percolating action after the heating units are energized. Suitable openings 43 may be provided adjacent the outer edges of the flange member 37 to permit of locating the heads of machine screws 42 therein.

The outer ends 44 and 45 of the heating units are connected to suitable contact terminals 46 insulated from and located in a contact terminal guard or casing 47 projecting outwardly through the wall of the hollow base 15. The other ends, 48 and 49, of the respective heating elements may be connected together by a small screw 51 and a nut 52 which may be located on, and supported by, the heat-insulating member 39.

I have found that, by the use of the hereinbefore described construction, I can reduce the amount of electric energy expended in the heating units and still obtain a relatively quick percolating action, and I believe the reason for this to be the compact construction providing relatively short heat paths from the heating unit to the vaporizing chamber.

Various modifications may be made in the device embodying my invention without departing from the spirit and scope thereof and I desire that only such limitations shall be placed thereon as are imposed by the prior art or are specifically set forth in the appended claims.

I claim as my invention:

1. In a fluid heater, in combination, a fluid container, a tubular member depending therefrom and constituting a vaporizing chamber for said container, a flat heating element carried by said tubular member and extending laterally thereof, and a laterally extending flange member integral with said tubular member for permitting the clamping of said heating element in heat conducting relation to said tubular member.

2. An electrically heated device comprising a fluid container, a tubular member secured to and depending from said container and constituting a vaporizing chamber, a flat heating element carried by said tubular member and extending laterally thereof, and means carried by said tubular member and located below said heating element for reducing the amount of heat radiated downwardly.

3. In an electrically heated device, in combination, a fluid container having an aperture in its base, a tubular member below said container and extending thereinto through said aperture, said tubular member having a laterally extending integral flange intermediate its ends and having also an axially disposed and longitudinally extending well in its upper portion, a flat heating element operatively engaging said flange and surrounding said tubular member, a flat clamping plate surrounding the lower portion of the tubular member and means mounted on the lower end of said tubular member for forcing said clamping plate against said heating element and for pressing the same against the integral flange.

4. In an electrically heated device, in combination, a fluid container having an aperture in its base, a tubular member extending through said aperture into said container and constituting a vaporizing chamber therefor, a plurality of spaced-apart flat heating elements surrounding and extending laterally of said tubular member, and means for holding said heating elements in proper operative positions on, and for providing a plurality of heat paths from, each of said heating elements to said tubular member.

5. In an electrically heated device, in combination, a fluid container, a hollow supporting base-member therefor, a tubular member secured to and depending from the bottom of said container inside of said base, a heating element operatively mounted on said tubular member, a heat-insulating member surrounding said tubular member adjacent its lower end and substantially coextensive with the interior of said base-member, and a single means for holding said heating element and said heat-insulating member in their proper operative positions on said tubular member.

6. In an electrically heated device, in combination, a fluid container having an aperture in its base, a tubular member below said container and extending thereinto through said aperture, said tubular member having a laterally extending integral flange intermediate its ends and having also an axially disposed and longitudinally extending well in its upper portion, a flat heating element operatively engaging said flange and surrounding said tubular member, a flat clamping plate surrounding the lower portion of the tubular member, means mounted on the lower end of said tubular member for forcing said clamping plate against said heating element and for pressing the same against the integral flange, and means for holding the outer edges of said flanged members in proper operative positions relatively to each other and for providing an additional heat path from the flat clamping plate to the flange portion of said tubular member.

7. In a fluid heater, in combination, a fluid container, a tubular member depending therefrom and constituting a vaporizing chamber for said container, and having a laterally extending integral flange portion intermediate its ends, a flat heating element operatively engaging the surface of said flange portion, a clamping flange below said heating element, means on said tubular member for tightly securing said heating element between said flange portion and said clamping plate and means for clamping the outer edges of said clamping plate and said flange portion against said heating element and for equalizing the temperature of the outer edges of said members.

In testimony whereof, I have hereunto subscribed my name this 2nd day of June 1922.

ORA A. COLBY.